(12) United States Patent
Santhana et al.

(10) Patent No.: US 9,031,877 B1
(45) Date of Patent: May 12, 2015

(54) CREDIT CARD FRAUD PREVENTION SYSTEM AND METHOD

(71) Applicant: Deloitte Development LLC, Hermitage, TN (US)

(72) Inventors: Prakash Santhana, Amawalk, NY (US); Jared Scott Miniman, Washington, DC (US); Joseph Lee Johnson, Brandon, MS (US); Rangaswami Saravanan, Kellyville (AU)

(73) Assignee: Deloitte Development LLC, Hermitage, TN (US)

( * ) Notice: Subject to any disclaimer, the term of this patent is extended or adjusted under 35 U.S.C. 154(b) by 207 days.

(21) Appl. No.: 13/906,870

(22) Filed: May 31, 2013

Related U.S. Application Data

(60) Provisional application No. 61/653,836, filed on May 31, 2012, provisional application No. 61/711,351, filed on Oct. 9, 2012, provisional application No. 61/776,346, filed on Mar. 11, 2013.

(51) Int. Cl.
*G06Q 20/40* (2012.01)
(52) U.S. Cl.
CPC .................................. *G06Q 20/4016* (2013.01)
(58) Field of Classification Search
CPC .......... G06Q 20/4016; G06Q 20/4014; G06Q 20/401
USPC ...................................................... 705/75, 50
See application file for complete search history.

(56) References Cited

U.S. PATENT DOCUMENTS

| | | | | |
|---|---|---|---|---|
| 7,136,835 | B1 * | 11/2006 | Flitcroft et al. | 705/39 |
| 7,562,304 | B2 * | 7/2009 | Dixon et al. | 705/35 |
| 2003/0028481 | A1 * | 2/2003 | Flitcroft et al. | 705/39 |

* cited by examiner

*Primary Examiner* — Calvin L Hewitt, II
*Assistant Examiner* — Cristina Sherr
(74) *Attorney, Agent, or Firm* — Kramer Levin Naftalis & Frankel LLP

(57) ABSTRACT

A mobile computing device is adapted to transmit to a scoring server URLs of websites browsed using the device. The scoring server can compare these URLs against a merchant URL obtained within a preselected time period from transaction data resulting from a transaction involving a payment product of the device user. A score can be calculated based on the similarity between each URL obtained from the device and the URL from the transaction data. The score represents the likelihood that a website browsed using the device and, as a result, the transaction, is fraudulent. The browsed URLs can also be scored against a database of known fraudulent websites. A notification concerning the legitimacy of the transaction based on the score can be generated and sent to the mobile device in real-time. On receiving the notification, the device can be used to either accept or decline the transaction in real-time.

16 Claims, 6 Drawing Sheets

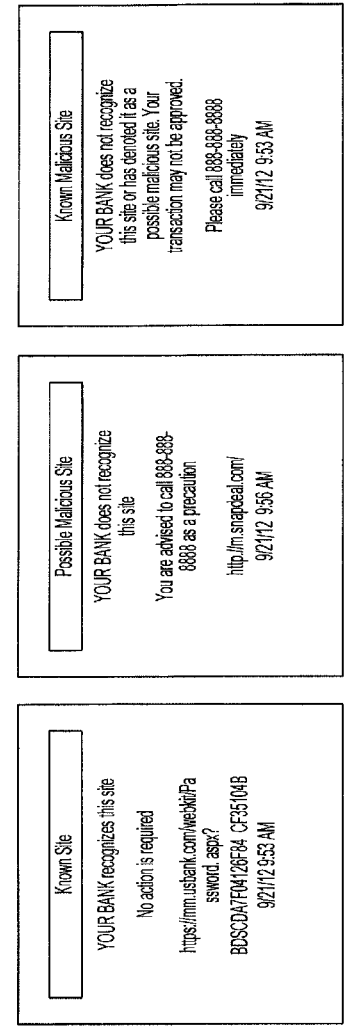

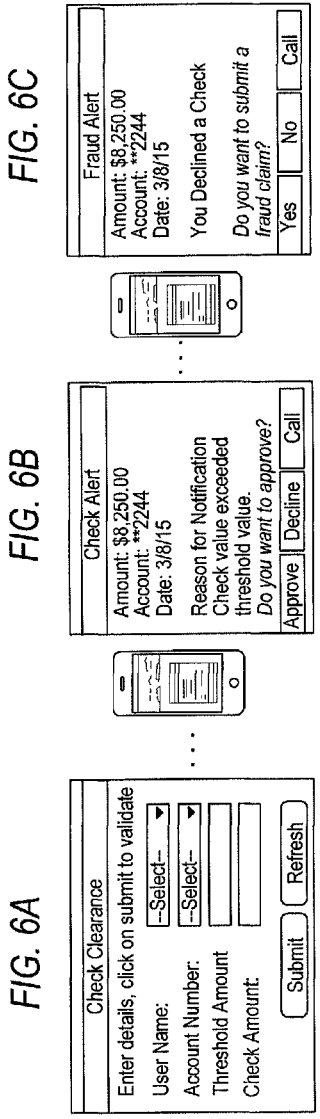

CREDIT CARD FRAUD PREVENTION SYSTEM AND METHOD

CROSS-REFERENCE TO RELATED PROVISIONAL APPLICATIONS

This application claims the benefit of U.S. Provisional Patent Application Nos. 61/653,836 filed on May 31, 2012, 61/711,351 filed on Oct. 9, 2012, and 61/776,346 filed on Mar. 11, 2013, the disclosures of which are hereby incorporated herein by reference in their entireties.

COPYRIGHT NOTICE

Portions of the disclosure of this patent document contain materials that are subject to copyright protection. The copyright owner has no objection to the facsimile reproduction of the patent document or patent disclosure as it appears in the U.S. Patent and Trademark Office patent files or records solely for use in connection with consideration of the prosecution of this patent application, but otherwise reserves all copyright rights whatsoever.

FIELD OF THE INVENTION

The present invention relates generally to the area of electronic commerce security, and more particularly to protecting against fraud in online payment product transactions involving a mobile computing device.

BACKGROUND OF THE INVENTION

Today's mobile computing devices typically run complete operating system software providing a standardized interface and platform for application (or "app") developers. Simply put, an app is software for enhancing a user's experience on a mobile computing device. In recent years there has been tremendous growth in demand for mobile computing devices boasting powerful processors, abundant memory, large screens and open operating systems. A smartphone is one example of a popular mobile computing device that includes a phone with e-mail and Internet access features. Demand for apps has grown in step.

Banks, financial institutions and other issuers of credit cards, bank cards, charge cards, and other payment products, as well as other e-businesses, have focused great attention on tapping into the rising demand for mobile computing devices through the provision of online, mobile financial services and transaction capabilities. However, they have faced hurdles in this regard, including the increasing problem of online/mobile fraud.

Online/mobile credit card fraud is a growing menace to card issuers, e-businesses and their customers as fraudsters target online payments using stolen card details. This type of "card-not-present" fraud takes advantage of the inability of merchants who sell and ship products and provide services online to physically inspect the credit cards. So, when credit card details (which can be easily stolen) are provided over the Internet, it is difficult for a merchant to verify that it is, in fact, the true card holder who is authorizing the purchase. Compounding the problem, shipping companies eschew taking responsibility for checking identification at the addresses where they ship products.

Credit card fraud is also an adjunct to identity theft. Phishing is one particularly problematic technique used to gain personal information for purposes of identity theft. Fraudsters use authentic-looking, fraudulent e-mail messages (which can include links to fraudulent websites) that appear to come from legitimate sources to fool recipients into divulging personal data such as, for example, card numbers, bank account numbers and passwords. It has been reported that approximately 450,000 phishing attacks in 2012 led to losses of approximately $1.5 billion—an increase of about 59% in number and 22% in financial loss over the previous year.

The financial services industry has developed preventive measures. But, such measures have met with limited success, i.e., because of vulnerability to fraud (such as, for example, "man-in-the-middle attacks" where a fraudster intercepts all messages between two endpoints, making each endpoint believe that it is communicating directly with the other over a private connection, when, in fact, the entire conversation is controlled by the fraudster) and/or poor industry adoption (e.g., because the measure is intrusive to the card holder at the point of sale). EMV (EUROPAY, MASTERCARD and VISA) smart card "chip and PIN" technology (the "chip" denoting the integrated circuit embedded in the card; the "PIN" denoting the personal identification number that must be supplied by the card holder) is one example. However, a drawback of using EMV cards is that, in card-not-present transactions, the card holder must use a personal card reading device.

Single and multi-factor authentication approaches also have their drawbacks in the online banking arena. Such approaches require the presentation of one or of two or more of three authentication factors: a knowledge factor ("something the user knows"), a possession factor ("something the user has"), and an inherence factor ("something the user is"). The single factor approach (e.g., a password) has been shown to be highly vulnerable to phishing attacks; the two-factor approach (e.g., a password and a secure token or a fingerprint) has been shown to be vulnerable to man-in-the-middle attacks; and the three-factor approach (e.g., a password, a secure token and a fingerprint) has experienced poor adoption by customers by reason of being too complicated.

Additionally, the use of credit card verification codes (e.g., CVC2/CVV2) in the e-commerce arena has proved vulnerable to phishing attacks. These are the three- or four-digit codes printed on the front of the card or on the signature strip on the back.

SUMMARY OF THE INVENTION

Generally speaking, the present invention relates to a new system and method that leverages a mobile computing device platform, such as for example a smartphone platform, to enable issuers of credit cards and other payment products to protect their card holders against online/mobile fraud while conducting financial transactions, and to communicate in real-time with the card holders concerning not only threat levels and attempted fraud, but also legitimate promotional offers and other messages.

According to one, preferred embodiment of the present invention, an inventive app resident on a user's mobile computing device can automatically cause the device to track, scrape and transmit to a scoring server, all URLs of websites browsed by the user. The scoring server can compare these URLs against a merchant URL obtained within a preselected time period from the transaction authorization data generated as a result of a transaction involving a payment product (e.g., credit card, charge card, debit card, or the like) of the user. A score can then be calculated based on the degree of similarity between each URL obtained from the user's device and the URL obtained from the transaction data (e.g., using text matching). The score represents the likelihood that a website browsed by the user and, as a result, the transaction, is fraudulent. That is, a score indicating a low degree of similarity raises the specter that a card-not-present transaction occurred with a merchant whose website the user did not actually visit—either because the user intended to transact with the legitimate merchant online but was, unbeknownst to the user, lured to a fraudulent site, or because the user did not even attempt to browse the merchant's site.

Based on the score, the bank or other financial institution responsible for processing the transaction can block or accept it. A notification concerning the legitimacy of the transaction based on the score can be generated and sent to the user's mobile device in real-time. On receiving the notification, the user can authorize the bank or other financial institution to either accept or decline the transaction. This can be accomplished in real-time using the mobile device.

According to a further embodiment of the present invention, the URLs visited by the card holder can also be scored against a database of known fraudulent websites.

According to a still further embodiment of the present invention, the database of known fraudulent websites can be updated based on the results of the scoring process.

According to another embodiment of the present invention, notifications to the user can include additional messages, such as, for example, a deposit account alert indicating that a check drawn on the user's account may be fraudulent. Informational and advertising/promotional messages can also be delivered to the user via the notifications.

According to yet another embodiment, the URLs and the scores can be stored and made available for data mining purposes.

Still other aspects and advantages of the present invention will in part be obvious and will in part be apparent from the specification.

The present invention accordingly comprises the several steps and the relation of one or more of such steps with respect to each of the others, and embodies features of construction, combinations of elements, and arrangement of parts adapted to effect such steps, all as exemplified in the detailed disclosure hereinafter set forth, and the scope of the invention will be indicated in the claims.

BRIEF DESCRIPTION OF THE DRAWINGS

For a fuller understanding of the invention, reference is made to the following description, taken in connection with the accompanying drawings, in which:

FIGS. 5A-5C depict exemplary threat level notifications according to an embodiment of the present invention; and FIGS. 6A-6C illustrate an exemplary two-way messaging process according to an embodiment of the present invention.

DETAILED DESCRIPTION OF THE PREFERRED EMBODIMENTS

Figure 1:
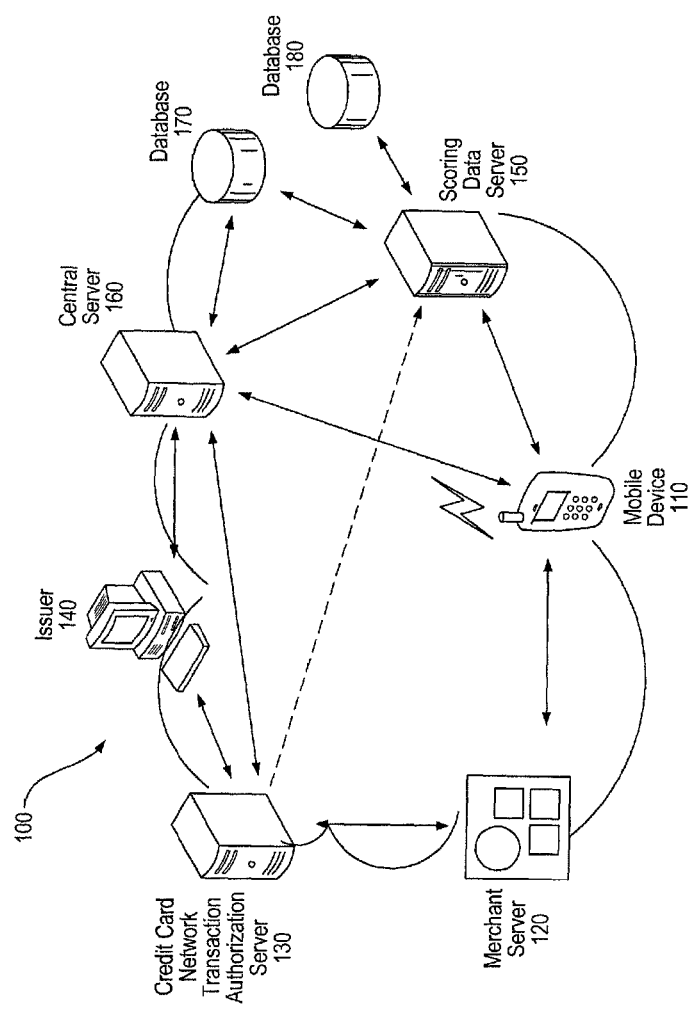
FIG. 1 is a schematic diagram depicting an exemplary credit card fraud prevention system according to an embodiment of the present invention.

FIG. 1 illustrates an exemplary architecture of a credit card fraud prevention system 100 according to an embodiment of the present invention. In some cases, the functional components of the system may be hardware, software or combinations of hardware and software.

On the card holder side, the system 100 includes the card holder's mobile computing device 110 (e.g., smartphone, tablet, laptop computer, etc.), which can have a web browser or the like installed thereon. The mobile computing device 110 can also have an app installed thereon that supplants or works in conjunction with the web browser (that is, a software component, e.g., an add-on or plug-in, that enhances the web browser) to provide functionality as described in greater detail hereinafter.

As is known in the art, a web browser (e.g., GOOGLE CHROME, FIREFOX, INTERNET EXPLORER, OPERA and SAFARI) is a software application that enables users to access, retrieve and view documents and other information resources on the Internet. To access a resource on the Internet, the user inputs a Uniform Resource Locator ("URL"), or web address, into the browser. The ubiquitous "http://" URL prefix identifies a resource to be retrieved via the HyperText Transfer Protocol (HTTP).

On the merchant side, there can be a merchant web server 120. Such web server is either the hardware or the software that is used to deliver content that can be accessed through the Internet and to receive and process purchase requests made by the card holder via the mobile computing device 110.

Typically, in processing a credit card purchase, the merchant transmits data about the purchase to the bank or other financial institution 140 that issued the card, e.g., directly if a credit card association, such as for example MASTERCARD or VISA, is not implicated, or, if a credit card association is implicated, by way of the merchant's processing bank, which transmits the transaction data to the credit card association, which then transfers the data to the issuing bank or financial institution 140 (it should be appreciated that the present invention is not limited to use of a credit card association model; the present invention has application with respect to payment products issued without the involvement of a credit card association). The issuing bank or other financial institution 140 then pays the merchant the amount on the credit card receipt (minus any transaction fee or commission), typically by applying a credit to the merchant's account (e.g., at the processing bank). The credit card issuer then applies the amount of the purchase to the card holder's balance on the credit card. The credit card network transaction authorization server 130 shown in FIG. 1 represents a mechanism by which a credit card purchase transaction can be processed according to conventional practices.

A scoring data server 150 can be provided on the financial transaction processing side (e.g., associated with or otherwise serving the bank or other financial institution that issued the card); and a central server 160 (e.g., also associated with or otherwise serving the issuing bank or other financial institution) can be functionally interposed between the card holder and the scoring data server. These servers 150, 160 can be configured to carry out functions in accordance with the embodiments of the present invention described in greater detail hereinafter.

Figure 2:
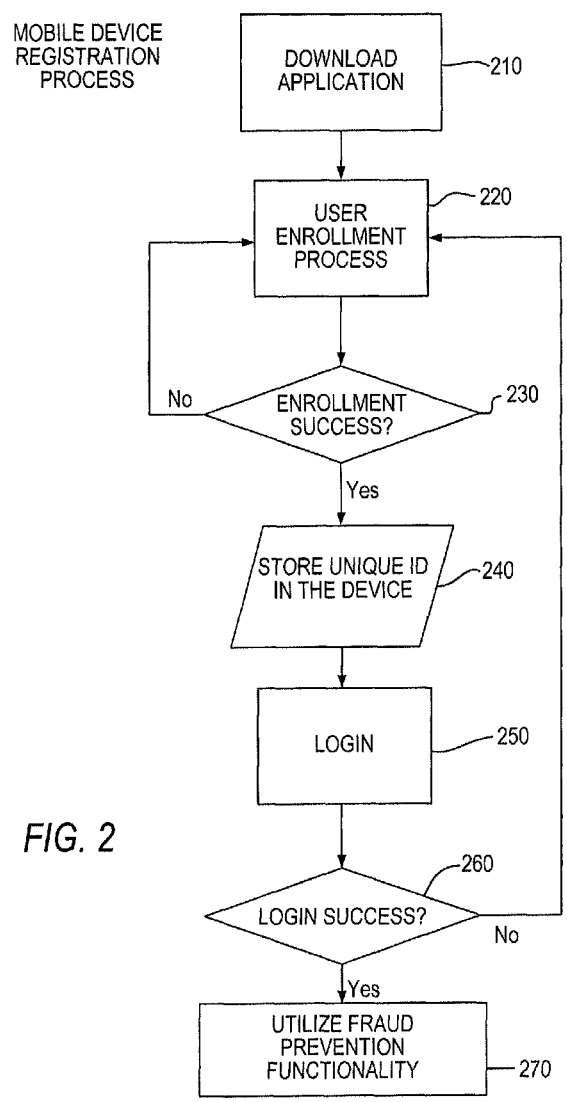
FIG. 2 is a flow chart illustrating an exemplary mobile device registration process according to an embodiment of the present invention.

A fraud prevention process according to an embodiment of the present invention, which can leverage the system 100 illustrated in FIG. 1, can involve registering the card holder's mobile device(s) 110. Referring also to FIG. 2, to register a device 110, the card holder can install the app, which includes a programmed set of instructions that can be executed on the device to effect the inventive processes, e.g., by downloading the app from the Internet (step 210) using, for example, conventional communication links Thereafter, the card holder can enroll as a user of the fraud prevention system 100 and process (step 220) through the card holder's mobile device 110.

Figure 3:
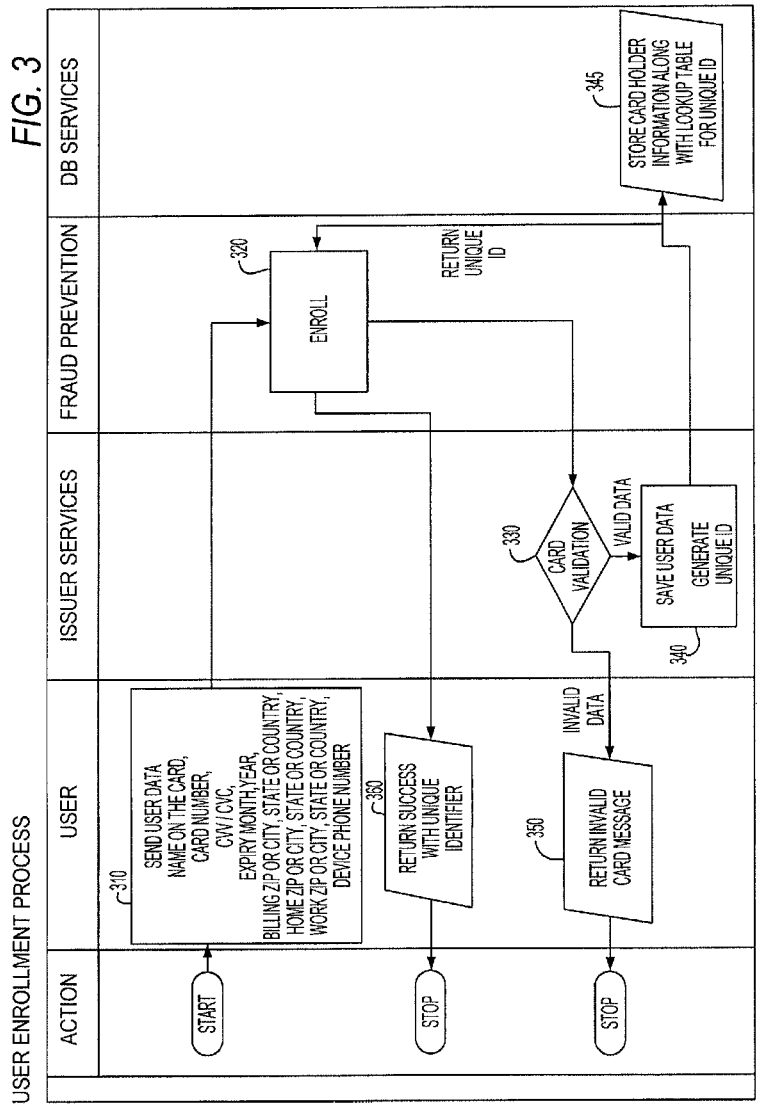
FIG. 3 is a flow chart illustrating an exemplary server-side user registration process according to an embodiment of the present invention.

Referring to FIG. 3, enrolling as a user (including creating a user account) can involve sending user information to the central server 160 (step 310), which can be the issuing bank's server or managed by a registration service that is either affiliated with or independent of the bank or other financial institution that issued the card. This user information can include the card holder's name (as presented on the card), addresses (billing, home, work), telephone numbers (mobile device number, home number, work number), e-mail addresses, and card information, i.e., the card type (e.g., debit, credit or charge; MASTERCARD, VISA or AMEX), the card number, CVV/CVC and expiration date. Additionally, the enrollment process may involve suitable conventional security measures such as, for example, providing answers to preselected security questions—indeed, it should be generally understood that issuing banks and other financial institutions can continue to employ all conventional security measures to protect customer transactions in tandem with any and all aspects of the salutary fraud prevention functionality provided by the embodiments of the present invention.

Thereafter, the central server 160 can process an authorization request to the bank or other financial institution 140 that issued the card (step 320). Such request can include at least a subset of the information provided to the central server 160 by the card holder in step 310. Preferably, such request includes the card information and billing ZIP code. The authorization request information can then be validated by the card issuer (step 330).

If an approval code is received with a valid match on all parameters at step 330, a unique ID can be generated for the mobile device 110 using the information provided with the authorization request (step 340); and the information including the unique ID can be stored in a secure database 170, which can be accessible by both the central server 160 and the scoring data server 150 (step 345). A hashed version of the unique ID can then be delivered to the device 110 (step 360). As an optional added security measure, when the unique ID has been generated and the hashed version delivered to the mobile device, all credit card information can be erased from the mobile device and the central server 160—leaving the scoring server 150 as the only place where the link between the unique ID and the card holder's credit card number exists.

If the authorization request cannot be validated at step 330, a message to this effect can be delivered to the card holder, and the user enrollment process can be revisited (see FIG. 2, step 350) or terminated.

Referring back to FIG. 2, with a successful user enrollment at step 230, the device registration process can continue at step 240, where the hashed version of the unique ID can be stored in the mobile device 110. Thereafter, the card holder can login to the fraud prevention system 100 for the first time (step 250), and with a successful login at step 260, take advantage of the features of the system 100 as described below (step 270). In the event of an unsuccessful user enrollment at step 230, or in the event of an unsuccessful first login at step 260, the card holder can revisit the user enrollment process at step 220.

It should be understood that, if the card holder has already registered the card holder's mobile device 110, for example, in connection with enrollment in an online banking relationship, the registration/enrollment process for purposes of the present invention can be streamlined. That is, it may only involve downloading the inventive app, as all the requisite card and device information should have already been provided.

Figure 4:
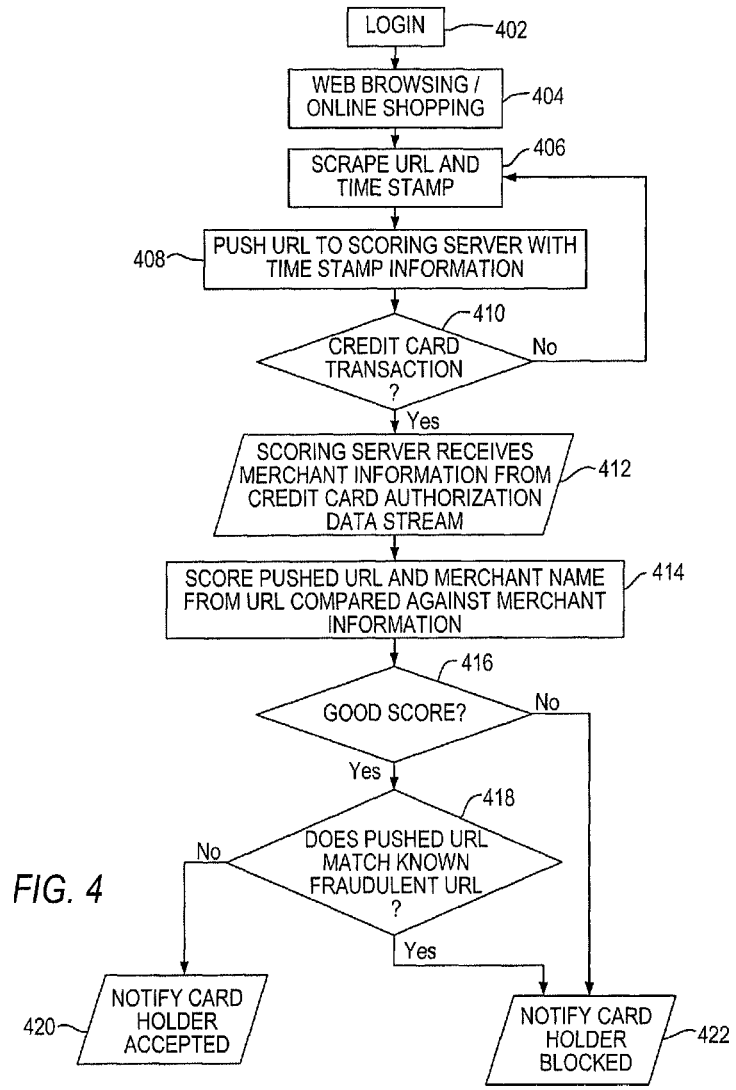
FIG. 4 is a flow chart illustrating an exemplary process for protecting against credit card fraud in accordance with an embodiment of the present invention.

Referring now to FIG. 4, to use the fraud prevention system 100 illustrated in FIG. 1, the enrolled card holder simply logs in using the registered mobile device 110 to navigate online and engage in web browsing/online shopping activity (steps 402 and 404). Preferably, the card holder can be prompted to enter a password or answer one or more security questions to access the functionality of the inventive app (desirably, the card holder need not show any other credential for any card or bank transaction conducted while using the app). This protects the card holder in the event that the card holder's mobile device 110 is lost or stolen.

During web browsing/online shopping activity, the app resident on the mobile device 110 can track the websites visited by the card holder and can scrape and "push" the URLs to the scoring server 150 (steps 406 and 408). As an alternative to pushing URLs for all websites visited, the app can scrape and push the URLs only when a "checkout" page is encountered.

Preferably, the data can be sent to the scoring server 150 along with time stamp information. The scoring server 150 can store the time-stamped data for the registered card holder for a preselected period of time.

When a transaction occurs (step 410), a merchant identification (e.g., typically including the merchant's name and URL) is sent in the authorization data stream from the merchant's point-of-sale system 120 (FIG. 1) to the credit card network transaction authorization server 130 in accordance with conventional practices. This identification can then be passed (e.g., directly or via the central server 160) to the scoring server 150 (step 412).

At the scoring server 150, the merchant identification in the authorization data stream can be compared against the URLs visited by the card holder using the registered mobile device 110 within a preselected time frame to determine whether the transaction is legitimate (step 414) (e.g., did a card-not-present transaction occur with a merchant whose website the card holder did not visit using any of the card holder's registered mobile devices—either because the card holder intended to transact with the merchant online but was instead lured to a phishing site, or the card holder just did not attempt to visit the merchant's website?). That is, for example, a transactional scoring algorithm can use text matching to compute scores based on the characters that match between portions of the merchant URL in the authorization data and the pushed URLs. Scores can be based on the degree of a match or the number of characters that match in the URL strings from the two data streams (matching character against character strictly by their positions in the strings) divided by the length of the longest string (preferably, excluding "."s). Scores can be scaled as desired to range from 0 to 1000, for example, with 1000 indicating a perfect match, and 0 indicating no match (e.g., a score of 0 can be returned if the user did not browse any websites using a registered mobile device to compare against a transaction in the relevant time period).

The score ranges can define the fraud threat levels. For example, a score falling in the range of 0-400 can indicate a high threat level, a score of 401-700 can indicate a moderate threat level, and a score of 701-1000 can indicate a low threat level.

More particularly, each URL can be broken into three substrings (str1, str2 and str3), which reside between the "http://" or "https://" and the next "/": str1="www"; str2=the merchant name; and str3=the domain (e.g., 'com', 'net', etc.). If the merchant name score is above 700 and the concatenated str1+str3 score is 1000, then the threat level is low. If the merchant name score falls within the range 400-700 and the concatenated str1+str3 score is 1000, the threat level is moderate. If the merchant name score is below 400 or if the concatenated str1+str3 score is not 1000, the threat level is high.

Note that if the pushed URL is a phishing site, the merchant name score can be expected to be moderate to high, but the URL score (str1+str3) will not be 1000. For example, "www.amazoncom.ru" (as opposed to "www.amazon.com") scores high for the merchant name (str1) match (6/9×1000=about 667), but the URL score does not equal 1000 (3/6×1000=500). Thus, because the URL score is not 1000, the threat level is high.

As another example, which illustrates that characters are compared based on their positions in the strings, take "www.amzon.com": the URL score is 1000 (6/6×1000); but, the merchant name score is about 333 (2/6×1000), which indicates a high threat.

Additionally or alternatively, one or more databases (e.g., database 180) accessible by the scoring server 150 can store correlations between merchants and their URLs (e.g., in a lookup table) that can be leveraged by the scoring algorithm in comparing the merchant identification in the authorization data stream against the merchant URL visited by the card holder to determine transaction legitimacy. This is advantageous where, for example, the merchant's URL is not included in the card authorization data and the merchant uses a URL that contains a different name (e.g., where the merchant uses a doing-business-as or "DBA" name) such that scoring based on text matching of merchant names may yield inconclusive results.

Also, when DBA names of merchants are different from their URLs, customers may not recognize transactions reported on their credit card statements, which can lead to unnecessary chargebacks. It should be appreciated that the capability of the inventive embodiments described below to alert the customer to the difference at the time of the transaction can help to avoid such unnecessary chargebacks. The card issuer can accumulate responses from the customer (e.g., via two-way messaging) concerning such transactions—storing the names of all merchants with DBA names different from their URLs with whom the customer transacted. This database (e.g., database 180) can be used on the backend when chargebacks are initiated.

Further, at the scoring server 150, the merchant URLs visited by the card holder can be compared against a database (e.g., database 180) of known phishing or other problematic websites (step 418). A score can be computed based thereon. So, if the resulting score is high, then the site visited is probably a fraudulent site.

Based on all the scoring discussed above, the transaction can then be either blocked or approved by the bank or other financial institution that issued the card, and a push notification to that effect can be sent in real time to the card holder's mobile device 110 (steps 420 or 422), e.g., directly from the scoring server 150 or via the central server 160. The card holder can then instruct the issuing bank or other financial institution (e.g., in real-time via two-way messaging) as to whether the transaction should or should not be consummated.

The notification to the card holder can be in the form of different threat levels to indicate the severity of the transaction or the website. For example, referring to FIGS. 5A-5C, three categories of threat level notifications can be generated based on the scoring: a low threat level illustrated in FIG. 5A (or safe or known website); a moderate threat level illustrated in FIG. 5B (or questionable or possible malicious website); and a high threat level illustrated in FIG. 5C (or dangerous or known malicious website). It should be understood that moderate and high threat levels preferably result in the issuing bank or other financial institution automatically blocking the transaction.

The notifications pushed to the card holder's mobile device 110 can also be color-coded based on the different threat levels. For example, the color green can be used to denote a low threat level; yellow to denote a moderate threat level; and red to denote a high threat level.

In view of the foregoing, a scoring algorithm can execute in accordance with the following exemplary logic:
Inputs: merchant name and card number.
i. Get all the captured URLs and the corresponding log IDs in the past T seconds.
ii. For each of the URL and log ID, call the match algorithm.
Match algorithm:
1. If the URL has more or fewer than 3 substrings, a score is not calculated and the following steps are skipped.
2. If the URL has 3 substrings—from the URL, getting str1 (protocol name), str2 (merchant name) and str3 (domain name).
3. Calling the string match algorithm with the merchant names from the phishing list and the merchant name (str2). The string match algorithm returns the list of matched merchant names along with the scores.
4. Calling the string match algorithm with the captured URL from the phishing list and the URL (str1+str3). The string match algorithm returns the list of matched URLs along with the scores.
   If the merchant result set returned from string matching is empty, update the visit log for this merchant with site name='NA', merchant score=0, URL score=0.
   If the merchant result set returned from string matching is not empty:
      Get the merchant score using the log ID from the visit log. If the merchant score is already present, the following steps are skipped.
      If the merchant score is not present, get the site ID from the phishing list based on the merchant score or captured URL.
      Update the visit log for the selected merchant name with site name='merchant name with the highest score from the merchant result set obtained from string matching', merchant score='highest score from the merchant result set obtained from string matching', URL score='highest score from the URL result set obtained from string matching' (if no URL match found, update as 0).
iii. Get the latest merchant name, captured URL, captured time stamp, merchant score, URL score etc. from the visit log visited by the owner of the card selected in the past T seconds and captured URL like selected.
iv. If no record is returned, it means the selected merchant is not visited. (Merchant score=0, URL score=0, Title=Fraudulent Transaction Performed, color code=red, description=The requested merchant was not visited from registered device(s). Your transaction may not be Legitimate. Please call 888-888-8888 immediately.).
v. If a record is returned:
   If the site name is 'NA', color code=B, title=Not Available, description=YOUR BANK has no adverse records for the site. No action is required.
   If the flag is 'P', color code=1.

If the captured URL has more or fewer than 3 substrings, color code=2.

If the merchant name score is above 700 and str1+str3 score is 1000, color code=4.

If the merchant name score is between 400 and 700 and str1+str3 score is 1000, color code=3.

If the merchant name score is below 400 or if str1+str3 is not 1000, color code=2.

Output:

1 Malicious Site warning. YOUR BANK has identified this site as a possible malicious site. Please call 888-888-8888 immediately. Red.

2 Unknown Site, potentially malicious. YOUR BANK does not recognize this site. Your transaction may not be approved. Please call 888-888-8888 immediately. Red.

3 Unrecognized Site. YOUR BANK does not recognize this site. You are advised to call 888-888-8888 as a precaution. Yellow.

4 Site Recognized. YOUR BANK recognizes this site. No action is required. Green.

Table 1 below includes additional scoring examples (based on the foregoing and on the assumption that the legitimate website is "http://www.chase.com").

TABLE 1

| URL | Merchant Score | URL Score | Threat |
|---|---|---|---|
| http://wwwchase.com/ | 0 | 0 | High |
| http://www-chase.com/ | 0 | 0 | High |
| http://www.chasecom.com/ | 625 | 1000 | Moderate |
| http://chase.com.cc/ | 200 | 143 | High |
| http://www.chase.com-sweepstakes-2011a.info/ | 1000 | 0 | High |
| http://www.chase.com | 1000 | 1000 | Low |

The notifications pushed to the customer's mobile device can advantageously include additional real-time messages from the bank or other card issuer concerning not only the status of the card holder's card transactions, but also concerning other matters. For example, general fraud warnings/alerts can be communicated and even promotional offers and other targeted marketing messages. In all cases, the card holder can respond to such messages in real-time from the card holder's mobile device 110 (e.g., via two-way messaging).

Indeed, according to an embodiment of the present invention, a bank can push deposit account notifications to its enrolled customers. For example, referring to FIGS. 6A-6C, the bank and/or the customer can establish a trigger or threshold to automatically notify the customer when a check drawn on that customer's account exceeds the threshold (this also has application with respect to automated teller machine transactions).

FIG. 6A illustrates an exemplary user interface by which the threshold can be input either by the bank or the customer. A rules engine can generate a list of customers to notify, and, via the appropriate server, push the notifications to all or a preselected subset of the customers' registered mobile devices.

FIG. 6B illustrates an exemplary notification pushed to a customer's device 110 that a check above threshold has been cashed. With a mere tap on the device screen, the customer can, in real-time, approve the check or decline it (or call the bank to discuss with a bank representative)—catching fraudulent transactions before funds are transferred.

Referring to FIG. 6C, if the customer declines the check, the customer can be prompted to submit a fraud claim request.

According to another advantageous aspect of the present invention, the issuing banks and other financial institutions can tap into the enrolled card holders' Internet interactions to obtain useful metrics regarding such interactions. For example:

The web browsing history (e.g., websites visited, time spent, and sites where transactions were conducted) for all enrolled customers can be analyzed by ranking websites based on fraudulent activity reported subsequent to a customer visit; websites can then be classified based on the reported financial fraud ranking or their risk (this can form a basis for generating a customer risk score based on browsing habits).

For each website class, average fraud loss per visit can be determined based on the total fraud loss associated with a website and the total number of visits for all customers.

Based on the number of visits to each website class, a potential customer fraud loss number can be computed by summing visits to a class multiplied by the average loss per class.

The potential future fraud loss for a customer at any given time can be used as a score to evaluate authorization actions that can be taken by an issuer for all future transactions for a given customer to minimize the fraud on that customer account.

Customer purchases per website visited can be computed by combining browsing history with transaction history.

Average purchases per site can be computed based on total purchases and the number of visits.

Cumulative purchases per customer for a given time period minus the potential fraud loss per customer for the same time period can yield a customer profit score.

Ranking of customer profit scores based on credit profiles and delinquency history can be used for targeted marketing purposes; patterns in the browsing history can be tied to transaction history and customer credit profiles to develop sophisticated real-time promotional offers.

Accordingly, the embodiments of the present invention address payment product fraud challenges in a new way (that is not dependent on merchants) through the registration of customer mobile devices, identification of rogue transactions and web sites, and improved customer communications. When a transaction on the customer's account is initiated from an unapproved device, or is the result of a customer encounter with a fraudulent website such as, for example, a phishing site, the bank or other financial institution can block the transaction, the customer can be notified, and the customer can provide instructions—all in real-time. With two-way, real-time messaging between the customer and the bank, the customer no longer has to call the bank to approve high-risk transactions, and banks can either allow the transaction to go through or remove the block so the customer can re-run the transaction.

It should be understood that the foregoing subject matter may be embodied as devices, systems, methods and/or computer program products. Accordingly, some or all of the subject matter may be embodied in hardware and/or in software (including firmware, resident software, micro-code, state machines, gate arrays, etc.). Moreover, the subject matter may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate or transport the program for use by or in connection with the instruction execution system, apparatus, or device.

The computer-usable or computer-readable medium may be for example, an electronic, magnetic, optical, electromagnetic, infrared, or semiconductor system, apparatus, device or propagation medium. Computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media includes RAM, ROM, EEPROM, flash memory or other memory technology that can be used to store information and that can be accessed by an instruction execution system.

Communication media typically embodies computer-readable instructions, data structures, program modules or other data in a modulated data signal such as a carrier wave or other transport mechanism and includes any information delivery media (wired or wireless). A modulated data signal can be defined as a signal that has one or more of its characteristics set or changed in such a manner as to encode information in the signal.

When the subject matter is embodied in the general context of computer-executable instructions, the embodiment may comprise program modules, executed by one or more systems, computers, or other devices. Generally, program modules include routines, programs, objects, components, data structures and the like, which perform particular tasks or implement particular abstract data types. Typically, the functionality of the program modules may be combined or distributed as desired in various embodiments.

Those of ordinary skill in the art will understand that the term "Internet" used herein refers to a collection of computer networks (public and/or private) that are linked together by a set of standard protocols (such as TCP/IP and HTTP) to form a global, distributed network. While this term is intended to refer to what is now commonly known as the Internet, it is also intended to encompass variations that may be made in the future, including changes and additions to existing protocols.

Further, it should be understood that the term "website" refers to a computer system that serves informational content over the Internet. As used herein, the term is generally intended to encompass both (i) the hardware/software components that serve the informational content over the network, and (ii) the "back-end" hardware/software components, including non-standard or specialized components, that interact with the server components to perform services for website users.

It will thus be seen that the objects set forth above, among those made apparent from the preceding description and the accompanying drawings, are efficiently attained and, since certain changes can be made in carrying out the above method and in the constructions set forth for the system without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A payment product fraud prevention method involving a mobile device running an app, the app scraping URLs from websites browsed by a user using the mobile device, the method comprising:
   periodically receiving, by at least one computing device platform server, data from the app on the mobile device, the data comprising at least one of the scraped URLs;
   associating, by the at least one computing device platform server, the at least one scraped URL and a time stamp with registration information of a user account of the mobile device;
   receiving, by the at least one computing device platform server, authorization data of a transaction comprising at least a merchant identifier from a payment server;
   associating, by the at least one computing device platform server, the merchant identifier with the user account registration information;
   retrieving, by the at least one computing device platform server, via a database, a correlation between the merchant identifier and URLs of the merchant;
   retrieving, by the at least one computing device platform server, the at least one scraped URL received within a preselected time period prior to the transaction;
   comparing, by the at least one computing device platform server, (i) at least one of the merchant identifier and the URLs of the merchant against (ii) the retrieved at least one scraped URL;
   by the at least one computing device platform server, calculating at least one score that the transaction is fraudulent based on a degree of similarity between (a) the merchant identifier and the URLs of the merchant and (b) the retrieved at least one scraped URL, and determining a threat level using the at least one score; and
   transmitting to the app on the mobile device a notification comprising the determined threat level and an additional message from the at least one computing device platform server.

2. The method of claim 1, further comprising causing the transaction to be one of blocked and accepted based at least in part on the at least one score.

3. The method of claim 1, further comprising storing the at least one score such that the scraped at least one URL and the at least one score are available for data mining.

4. The method of claim 1, wherein the determined threat level is one of low, moderate and high.

5. The method of claim 1, further comprising prompting the user to one of accept and decline the transaction.

6. The method of claim 1, wherein the user account includes a bank account, and the additional message includes a deposit account alert indicating that a check drawn on the user account has exceeded a preselected threshold amount.

7. The method of claim 6, further comprising prompting the user (i) to one of approve and decline the check, and (ii) when the check is declined, to submit a fraud claim.

8. The method of claim 1, wherein the additional message includes at least one of an advertising, a marketing, and a promotional offer message.

9. The method of claim 1, further comprising comparing retrieved at least one scraped URL against a database of URLs of known fraudulent websites to determine whether the retrieved at least one scraped URL corresponds to any of the fraudulent websites.

10. The method of claim 1, wherein the user account includes one of a bank account, a credit card account, and a charge card account.

11. The method of claim 1, wherein the mobile device is one of a smartphone, a tablet computer, a laptop computer, a notebook computer, and a personal digital assistant.

12. The method of claim 1, wherein scraping URLs is effected only when website checkout pages are browsed using the mobile device.

13. The method of claim 1, further comprising updating a database identifying fraudulent websites based at least in part on the at least one score.

14. A payment product fraud prevention system, comprising:
a mobile device including an app configured to scrape URLs from websites browsed by a user using the mobile device; and
a computing device platform server, the server being configured to:
(i) periodically receive data from the app on the mobile device, the data comprising at least one of the scraped URLs,
(ii) associate the at least one scraped URL and a time stamp with registration information of a user account of the mobile device,
(iii) receive authorization data of a transaction comprising at least a merchant identifier from a payment server,
(iv) associate the merchant identifier with the user account registration information,
(v) retrieve, via a database, a correlation between the merchant identifier and URLs of the merchant,
(vi) retrieve the at least one scraped URL received within a preselected time period prior to the transaction,
(vii) compare (a) at least one of the merchant identifier and the URLs of the merchant against (b) the retrieved at least one scraped URL,
(viii) calculate at least one score that the transaction is fraudulent based on a degree of similarity between (1) the merchant identifier and the URLs of the merchant and (2) the retrieved at least one scraped URL,
(ix) determine a threat level using the at least one score, and
(x) transmit to the app on the mobile device a notification comprising the determined threat level and an additional message.

15. The system of claim 14, further comprising at least one database storing uniform resource locators of fraudulent websites; and wherein the computing device platform server is configured to compare the at least one scraped URL against the at least one database to determine whether the at least one scraped URL corresponds to any of the fraudulent websites.

16. The system of claim 14, wherein the mobile computing device is one of a smartphone, a tablet computer, a laptop computer, a notebook computer, and a personal digital assistant.

* * * * *